(12) United States Patent
Riemer et al.

(10) Patent No.: US 8,270,292 B2
(45) Date of Patent: Sep. 18, 2012

(54) METHOD FOR TRANSFERRING DATA

(75) Inventors: Thorsten Riemer, Baiersdorf (DE); Rudolf Schmidt, Mühlhausen (DE)

(73) Assignee: Siemens Aktiengesellschaft, Munich (DE)

( * ) Notice: Subject to any disclaimer, the term of this patent is extended or adjusted under 35 U.S.C. 154(b) by 671 days.

(21) Appl. No.: 12/308,642

(22) PCT Filed: May 25, 2007

(86) PCT No.: PCT/EP2007/055097
§ 371 (c)(1),
(2), (4) Date: Dec. 19, 2008

(87) PCT Pub. No.: WO2007/147700
PCT Pub. Date: Dec. 27, 2007

(65) Prior Publication Data
US 2010/0265815 A1 Oct. 21, 2010

(30) Foreign Application Priority Data
Jun. 22, 2006 (DE) .................. 10 2006 028 686

(51) Int. Cl.
H04L 12/28 (2006.01)
(52) U.S. Cl. .................. 370/225; 370/332; 370/437
(58) Field of Classification Search .................. 370/225, 370/332, 437
See application file for complete search history.

(56) References Cited

U.S. PATENT DOCUMENTS

| | | | |
|---|---|---|---|
| 7,506,064 B1 * | 3/2009 | Kruger et al. | 709/239 |
| 2002/0073240 A1 | 6/2002 | Kokkinen et al. | |
| 2005/0009530 A1 | 1/2005 | Maillard et al. | |
| 2006/0050736 A1 * | 3/2006 | Segel | 370/474 |
| 2006/0159048 A1 * | 7/2006 | Han et al. | 370/331 |
| 2007/0032225 A1 * | 2/2007 | Konicek et al. | 455/417 |
| 2007/0265005 A1 * | 11/2007 | Sitch | 455/435.1 |
| 2007/0268877 A1 * | 11/2007 | Buckley et al. | 370/338 |
| 2008/0146244 A1 * | 6/2008 | Inoue et al. | 455/452.2 |

FOREIGN PATENT DOCUMENTS

| | | |
|---|---|---|
| DE | 10 2004 042 308 | 3/2006 |
| DE | 10 2004 049 752 | 4/2006 |
| DE | 10 2007 049 752 | 9/2008 |
| EP | 1 209 928 | 5/2002 |
| EP | 1 370 054 | 12/2003 |
| EP | 1 496 719 | 1/2005 |
| EP | 1 209 928 | 7/2005 |

OTHER PUBLICATIONS

Huber+Suhner Antennas, Railway Antennas Application Note, Internet Citation, Oct. 2004 XP002384417, Magazine, 2004.

(Continued)

Primary Examiner — Jason Mattis
(74) Attorney, Agent, or Firm — Harness, Dickey & Pierce, P.L.C.

(57) ABSTRACT

In one embodiment of the present invention, a method is disclosed for transferring data, in particular between a rail vehicle and a control center. According to one embodiment of the invention, a broadband transfer path is automatically activated for the period of time that the transfer path is available and the previous transfer path is deactivated. According to another example embodiment specific to the present invention, another transfer path is automatically activated if the other transfer path malfunctions.

13 Claims, 1 Drawing Sheet

OTHER PUBLICATIONS

English language abstract of WO Publication No. 2008113527, published Sep. 25, 2008 submitted for German Publication No. DE 10 2007 049 752.

Office Action for corresponding German Application No. 10 2006 028 686.3-31.

International Search Report dated Sep. 17, 2007.

Huber+Suhner Antennas. Railway Antennas Application Note, Internet Citation, Oct. 2004 XP002384417, Magazine, 2004.

Newton, Harry, "Newton's Telecom Dictionary", $21^{st}$ Updated and Expanded Edition, San Francisco, CMP Books, 2005, S. 670, ISBN 1-57820-315-5.

* cited by examiner

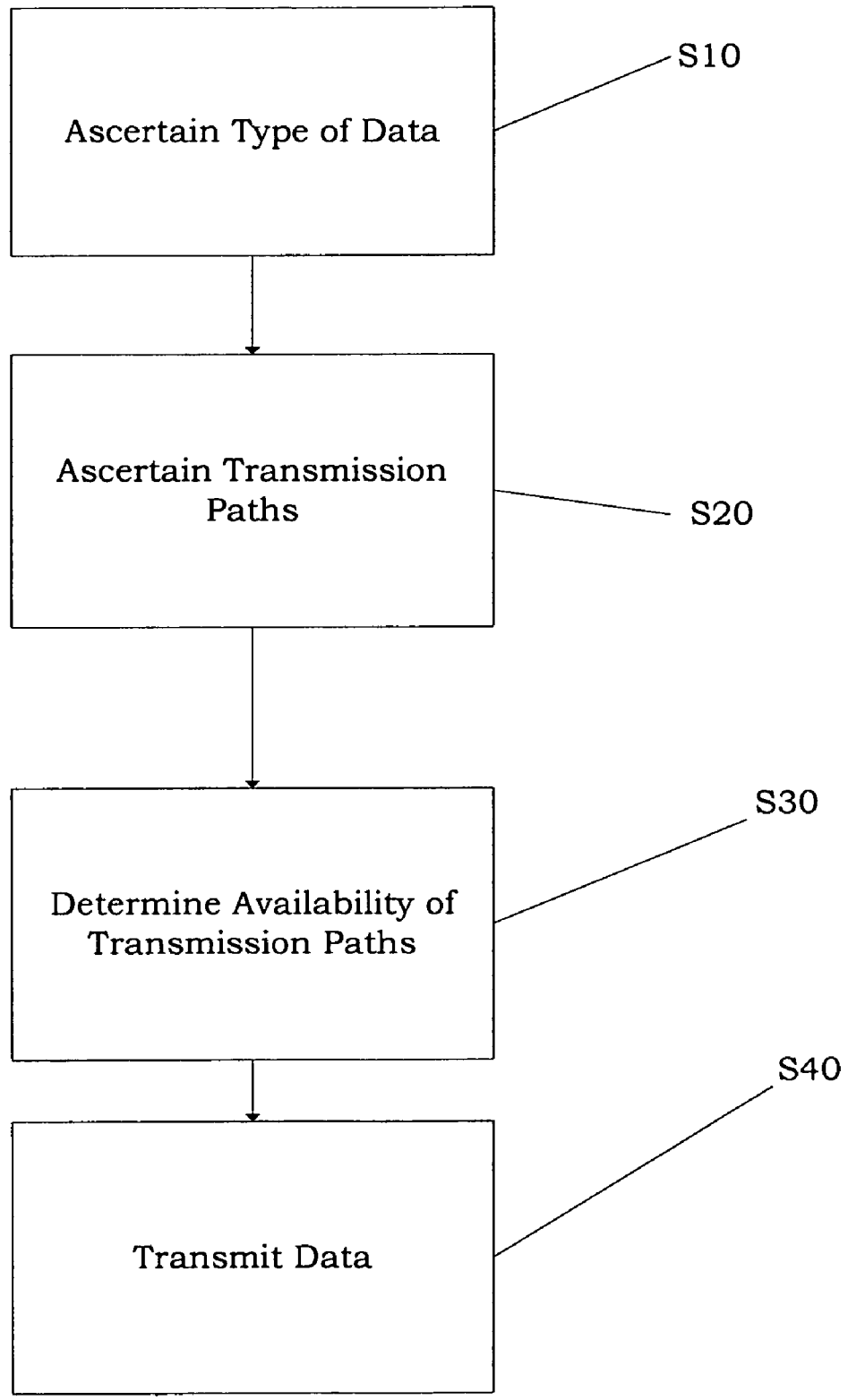

METHOD FOR TRANSFERRING DATA

PRIORITY STATEMENT

This application is the national phase under 35 U.S.C. §371 of PCT International Application No. PCT/EP2007/055097 which has an International filing date of May 25, 2007, which designated the United States of America and which claims priority on German application Nos. 10 2006 028 686.3 filed Jun. 22, 2006, the entire contents of which is hereby incorporated herein by reference.

FIELD

At least one embodiment of the invention generally relates to a method for transmitting data, particularly between a rail vehicle and an operational control center.

BACKGROUND

In railway traffic, it is already customary for there to be a communication link between a rail vehicle and an operational control center. The operational control center may be at a station or else in a signal box, for example. Several radio systems are available for the communication. To date, the communication between a rail vehicle and the operational control center has been aimed primarily at allowing smooth railway traffic to proceed. Additional data, such as seat reservations, have been able to be transmitted only to a limited extent. If a fault made by the radio link between the rail vehicle and the operational control center failed, a fault in the whole operating cycle has been possible to date.

SUMMARY

At least one embodiment of the invention is directed to a method for transmitting data which allows additional volumes of data, which are not directly linked to the safe flow of the railway traffic, to be transmitted at least occasionally. A development of at least one embodiment of the method is intended to ensure that even if the current radio link fails it is nevertheless possible for the railway to continue to operate reliably.

At least one embodiment of the invention allows additional volumes of data to be managed at least intermittently in that, for the period of time in which a broadband transmission path is available, this transmission path is automatically activated and the previous transmission path is deactivated.

This attains the advantage that a broadband transmission path which is possibly present is immediately recognized and also used. It is then possible for data of subordinate significance to be immediately interchanged between the rail vehicle and the operational control center via this broadband transmission path.

The additional data may relate to the self-diagnosis of the rail vehicle, for example, may update the seat reservation or may be data from an Internet connection, which also includes electronic mail.

BRIEF DESCRIPTION OF THE DRAWINGS

FIG. 1 illustrates a method according to an example embodiment.

DETAILED DESCRIPTION OF THE EXAMPLE EMBODIMENTS

By way of example, the type of data to be transmitted is taken as a basis for stipulating a priority list for the order of the transmissions. If only a small volume of data can be transmitted, only the most important data are taken into account. As soon as a broadband transmission path is available, the data which are subordinate in the priority list are then automatically transmitted.

A possible priority list can firstly provide train safety data, then passenger emergency alarms, then other operational data, then position data and finally the rest of the data.

A priority list of this kind attains the advantage that the fundamental data are transmitted even when there is no broadband transmission path available.

According to one particular development of an embodiment of the method, it still allows further, reliable operation of the railway even when the current radio link fails is achieved by virtue of the fact that, when one transmission path fails, another transmission path is automatically activated.

This attains the advantage that it is not necessary to search for an alternative to an inoperative transmission path. There is therefore now barely any possibility of faults on account of the absence of transmission paths.

As shown in FIG. 1, by way of example, as a first step, the type of data to be transmitted is ascertained for the transmission of data at S10. As a second step at S20, the transmission paths which are suitable for this type of data are ascertained. As a third step at S30, these individual transmission paths are then successively used to ascertain the availability of a receiver. As soon as a transmission path has been found via which the receiver is available, the data are transmitted via this current transmission path as a fourth step at S40. If the receiver is not available via any of the previously ascertained transmission paths, however, then at least one new transmission path is ascertained. This transmission path is then used to conduct the process in exactly the same way as with the previously ascertained transmission paths. When a transmission path via which the receiver is available has been ascertained, the data are transmitted.

The advantage attained is that the most suitable operative transmission path is always found. This ensures optimum data transmission between a rail vehicle and an operational control center.

By way of example, the number of transmission paths for which the availability of the receiver has been successively ascertained is counted. This makes it possible to document how large the number of attempts at setting up a connection was, so as thereby to obtain an indication of the reliability of the method.

By way of example, when a prescribed number is reached, no further transmission attempt is made. Further, an error message is sent. This allows the search for a suitable transmission path to be limited in time.

A process is used to identify whether an error occurs in a plurality of transmission paths simultaneously.

The method for transmitting data according to an embodiment of the invention achieves the advantage, in particular, that large volumes of data can be reliably transmitted between a rail vehicle and an operational control center.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for transmitting data between a rail vehicle and a railway operational control center, comprising:
    differentiating data to be transmitted between data of high significance and data of subordinate significance;

for a period of time in which a broadband transmission path is available,
- automatically activating the broadband transmission path and deactivating a previous transmission path; and
- transmitting data of high significance and subordinate significance between the rail vehicle and the operational control center via said broadband transmission path;

for a period of time in which a broadband transmission path is not available,
- ascertaining a type of data to be transmitted;
- ascertaining transmission paths suitable for the type of data;
- successively using said suitable transmission paths to ascertain the availability of a receiver at said railway operational control center;
- transmitting data of high significance, upon a transmission path being ascertained via which the receiver is available, via the ascertained transmission path between the rail vehicle and the operational control center; and ascertaining, upon the receiver not being available via any of the previously ascertained transmission paths, at least one new transmission path and then using the at least one new transmission path to ascertain the availability of the receiver.

2. The method as claimed in claim 1, wherein the type of data to be transmitted is taken as a basis for stipulating a priority list for the order of the transmissions.

3. The method as claimed in claim 1, wherein, when one transmission path fails, another transmission path is automatically activated.

4. The method as claimed in claim 1, wherein a number of transmission paths for which the availability of the receiver is successively ascertained is counted.

5. The method as claimed in claim 4, characterized wherein, when a number is reached, no further transmission attempt is made and an error message is sent.

6. The method as claimed in claim 2, wherein, when one transmission path fails, another transmission path is automatically activated.

7. The method as claimed in claim 2, wherein a number of transmission paths for which the availability of the receiver is successively ascertained is counted.

8. The method as claimed in claim 7, wherein, when a number is reached, no further transmission attempt is made and an error message is sent.

9. The method as claimed in claim 3, wherein a number of transmission paths for which the availability of the receiver is successively ascertained is counted.

10. The method as claimed in claim 9, wherein, when a number is reached, no further transmission attempt is made and an error message is sent.

11. The method as claimed in claim 2, further comprising:
- defining in the priority list data having subordinate significance and data having higher significance.

12. The method as claimed in claim 11, wherein the data having subordinate significance include at least one of self-diagnosis data of the rail vehicle, seat reservation data, data from an Internet connection.

13. The method as claimed in claim 11, wherein the data having higher significance include at least one of train safety data, passenger emergency alarms, position data.

* * * * *